United States Patent [19]

Holowach et al.

[11] Patent Number: 5,690,280
[45] Date of Patent: Nov. 25, 1997

[54] MULTIFUNCTION EXHAUST SYSTEM FOR GAS TURBINE ENGINES

[75] Inventors: Joseph Holowach, Cincinnati; William Van Sutherland, Milford; William Harvey Wooten, Cincinnati, all of Ohio

[73] Assignee: General Electric Company, Cincinnati, Ohio

[21] Appl. No.: 571,793

[22] Filed: Aug. 24, 1990

[51] Int. Cl.⁶ .................... F02K 1/62; F02K 1/40
[52] U.S. Cl. .................. 239/265.25; 239/265.35; 239/265.19; 60/230
[58] Field of Search ............ 239/265.25, 265.27, 239/265.29, 265.33, 265.35, 265.37, 265.39; 60/230, 232

[56] References Cited

U.S. PATENT DOCUMENTS

| | | | |
|---|---|---|---|
| 2,944,394 | 7/1960 | Peregrine | 239/265.29 |
| 3,040,523 | 6/1962 | Price | 239/265.35 |
| 3,060,685 | 10/1962 | Tonnies et al. | 244/110 B |
| 3,068,642 | 12/1962 | Schmidt | 239/265.19 |
| 3,439,504 | 4/1969 | Logerot et al. | 239/265.33 |
| 3,721,406 | 3/1973 | Hurlbert | 244/110 B |
| 3,807,639 | 4/1974 | Soligny et al. | 239/265.19 |
| 4,005,823 | 2/1977 | Thayer | 239/265.37 |
| 4,074,859 | 2/1978 | Lowman | 239/265.33 |
| 4,836,451 | 6/1989 | Herrick et al. | 239/239.35 |

FOREIGN PATENT DOCUMENTS

| | | | |
|---|---|---|---|
| 607075 | 3/1959 | Italy | 244/110 B |
| 950288 | 2/1964 | United Kingdom | 239/265.39 |

*Primary Examiner*—Michael J. Carone
*Attorney, Agent, or Firm*—Andrew C. Hess; Patrick R. Scanlon

[57] ABSTRACT

A short take off and vertical landing (STOVL) nozzle for a jet aircraft provides thrust reversing and thrust vectoring functions using two pairs of flaps. Each flap is independently actuated and controlled to allow for numerous exhaust gas exit configurations. A two dimensional or rectangular center plug extends across the nozzle throat region to allow one pair of flaps to selectively engage the plug for STOVL operation.

19 Claims, 2 Drawing Sheets

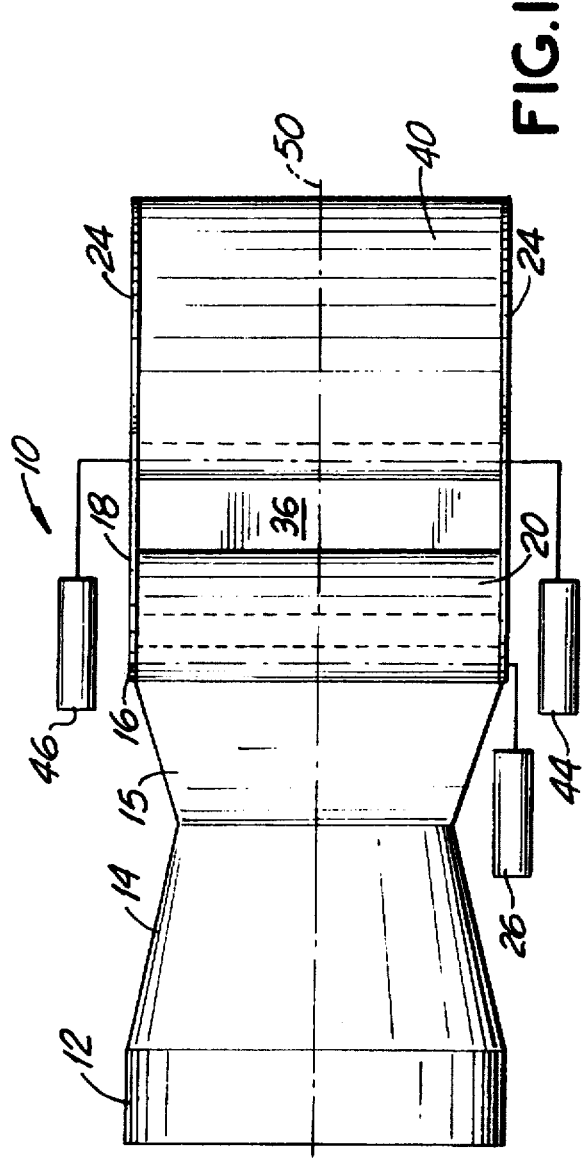
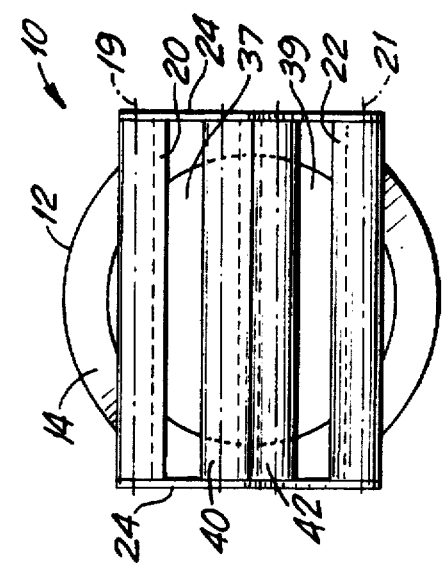
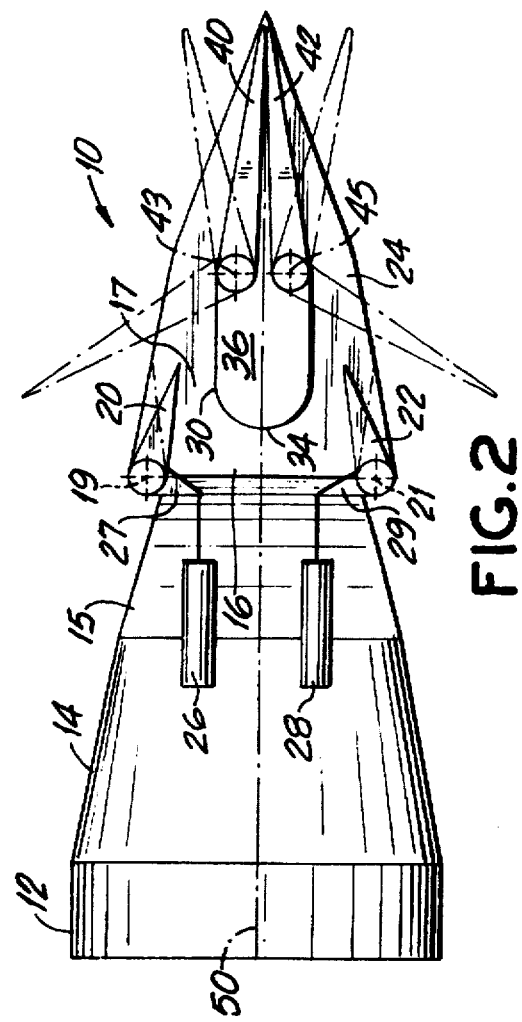

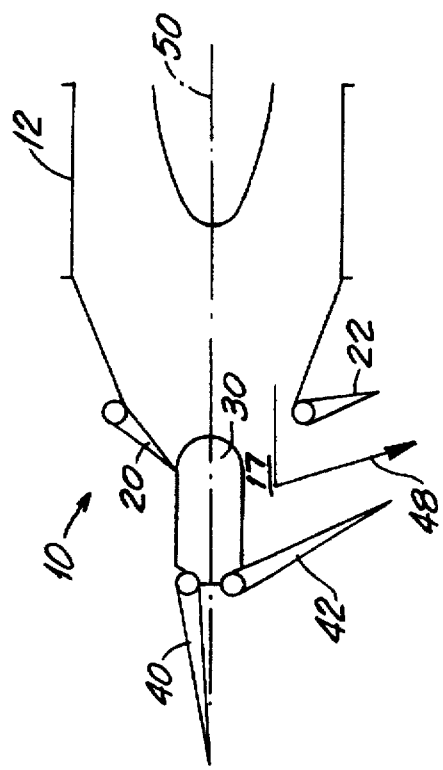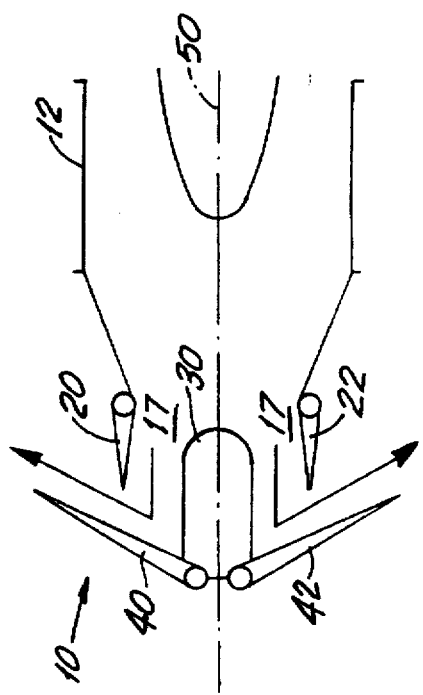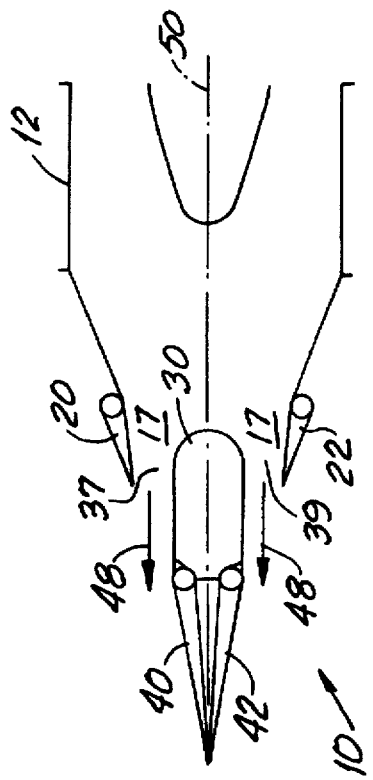

MULTIFUNCTION EXHAUST SYSTEM FOR GAS TURBINE ENGINES

BACKGROUND OF THE INVENTION

This invention was made with Government support under Contract No. F33657-83-C-0281 awarded by the Department of the Air Force. The Government has certain rights in this invention.

1. Field of the Invention

The present invention generally concerns exhaust nozzles for jet engines and particularly concerns a short take-off and vertical landing (STOVL) nozzle which includes thrust vectoring and thrust reversing functions.

2. Description of Prior Developments

Conventional jet engine exhaust systems which provide both thrust vectoring and thrust reversing capabilities tend to be rather heavy and require complex control systems. This is a distinct drawback in jet aircraft applications where maneuverability and reliability are of utmost importance. Another drawback associated with these conventional systems is that their maintenance and repair tends to be somewhat complicated.

When such conventional exhaust systems are required to provide for short take off and vertical landing about airfields with short or damaged landing strips, the weight and control problems mentioned above become even more pronounced. This problem is particularly acute in the design of military aircraft which must further provide enhanced maneuverability for combat situations.

Accordingly, a need exists for a jet engine exhaust system which provides STOVL capabilities as well as thrust vectoring and thrust reversing functions. Such a system should be relatively light weight, easy to repair and to maintain and relatively uncomplicated in design in order to promote system reliability.

SUMMARY OF THE INVENTION

The present invention has been designed to fulfill the needs noted above and therefore has as a primary object the provision of a light weight jet engine exhaust system which includes STOVL capabilities as well as thrust vectoring and thrust reversing functions.

Another object of the invention is to provide an aircraft jet engine exhaust system of the type described above which includes an uncomplicated four flap design wherein two pairs of independently activated flaps allow for the interchange of parts between each flap pair as well as the interchange of their associated actuators.

Another object of the invention is the provision of an aircraft jet engine exhaust system which employs the same flaps for all thrust vectoring functions as well as for the control of engine back pressure.

Still another object of the invention is the provision of an aircraft jet engine exhaust system which is relatively easy to maintain, reliable and which requires fewer components than existing exhaust systems which provide equivalent functions.

Briefly, the present invention is directed to a light weight jet engine exhaust nozzle which combines STOVL components with thrust vectoring and thrust reversing components in a relatively uncomplicated four flap, two dimensional nozzle. A pair of independently operated primary flaps, in cooperation with a two-dimensional nozzle plug, controls the throat area of the nozzle while a pair of independently operated divergent flaps located downstream from the primary flaps vector the engine thrust to provide the capabilities and functions noted above.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 1 is a top plan schematic view of an aircraft jet engine exhaust system according to the invention;

FIG. 2 is a side elevation view of FIG. 1 showing in phantom various operational positions of the divergent flaps;

FIG. 3 is a aft or rear end view of FIG. 1; and

FIGS. 4 through 7 are schematic views representing various operational modes of the exhaust system of FIGS. 1–3.

In the various figures of the drawing, like reference characters designate like parts.

DETAILED DESCRIPTION OF THE PREFERRED EMBODIMENT

The present invention will now be described in conjunction with the drawings, beginning with FIGS. 1, 2 and 3 which show a jet engine exhaust nozzle system 10 adapted for use with a high performance jet aircraft. Exhaust system 10 includes an exhaust duct 12 which transitions from a round cross section at 14 through a transition duct 15 to a two dimensional or rectangular cross section at exhaust nozzle portion 16 which is located upstream from the rectangular convergent nozzle section 18.

A first pair of primary flaps 20, 22 is pivotally mounted across nozzle throat 17. Primary flaps 20, 22 are supported by the nozzle casing side walls 24 for rotation about pivot axes 19, 21. Each primary flap 20, 22 is respectively operated by an independently controlled actuator 26, 28 of conventional design such as the fluid-powered piston-driven actuators shown in FIGS. 1 and 2.

The upper actuator 26 independently sets the position of the upper primary flap 20 while the lower actuator 28 independently sets the position of the lower primary flap 22. Each actuator independently drives an associated crank arm 27, 29 respectively fixed to each flap 20, 22 thereby rotating each flap about its pivot shaft axis 19, 21.

It can be best seen in FIG. 2 that the primary flaps 20, 22 cooperate with a center plug 30, which is a static structural member that extends transversely across rectangular section 18 of the exhaust duct and is mounted or attached to the opposing nozzle side walls 24. The leading edge 34 of center plug 30 may be rounded or semi-cylindrical and transition to a rectangular cross section which defines a rectangular plug body portion 36. At least the upper primary flaps 20 and preferably both primary flaps 20, 22 are sealingly engageable with the plug body portion 36.

The upper and lower primary flaps 20, 22 are operated to define and control the exit area of nozzle throat 17 adjacent the center plug 30 in order to maintain efficient engine operation. As seen schematically in FIG. 4, the center plug 30 divides the exhaust duct 12 into an upper flow path 37 and a lower flow path 39.

A second pair of secondary or divergent flaps 40, 42 is pivotally mounted about shaft pivot axes 43, 45 to the sidewalls 24 of the two dimensional nozzle section 18 adjacent the aft end of the rectangular plug body portion 36. When the divergent flaps 40, 42 are positioned as shown in solid lines in FIG. 2, these flaps form a smooth transition with the plug body portion 36 to define a tapered expansion surface on the aft end of the center plug 30. The divergent flaps 40, 42 are typically of a length greater than that of the primary flaps 20, 22 and are spaced sufficiently aft or downstream of the primary flaps to provide adequate flow control surfaces to effect the operational modes depicted in FIGS. 5–7.

As with the upper and lower primary flaps 20, 22, the upper and lower divergent flaps 40, 42 are respectively operated by independently controlled upper and lower actuators 44, 46. Actuators 26, 28 and 44, 46 may, for example, take the form of either linear actuators as described above or rotary actuators which independently effect pivotal movement of their respective flaps to selectively vector the thrust of the exhaust gas 48 as shown in FIGS. 4 through 7.

Preferably, both the upper and lower primary flaps and their respective actuators are of substantially the same or identical design or configuration. This is also preferably the case with the upper and lower divergent flaps and their respective actuators. This duplication in design allows for reduced parts inventory and simplifies repair and maintenance procedures since the same flaps and actuators may be used on both the upper and lower positions.

As seen in FIG. 4, the primary flaps 20, 22 and the divergent flaps 40, 42 are aligned substantially parallel to the axis 50 of the exhaust duct 12 during normal cruise operation of the aircraft. In this mode, both the upper and lower flow paths 37, 39 are open to allow for the controlled flow of exhaust gas 48 substantially parallel with axis 50.

FIG. 5 shows the exhaust system 10 actuated for vertical landings or vertical take offs. In this mode, the upper primary flap 20 is pivoted downwardly to engage the center plug 30 so as to seal off the flow of exhaust gas through the upper flow path 37 and to prevent flow over the upper surface of the center plug. Upper primary flap 20 deflects this gas downwardly toward the lower primary flap 22 which, in cooperation with the lower divergent flap 42, directs the exhaust gas downwardly to generate vertical thrust by pivoting lower primary and divergent flaps 20 and 22 respectively through an angle, with respect to axis 50, of about 90 degrees or more.

The exhaust system 10 is actuated in FIG. 6 to provide for pitch vectoring wherein the primary flaps 20, 22 are aligned to allow substantially free flow of exhaust gas through flow paths 37, 39 and wherein the divergent flaps 40, 42 are aligned to deflect the exhaust gas 48 at an acute angle A with respect to axis 50. It can be appreciated that the exhaust gas 48 may be deflected upwardly as seen in FIG. 6 or downwardly in a similar fashion depending on the particular aircraft maneuver required.

A thrust reversing mode is shown in FIG. 7 wherein the primary flaps 20, 22 are aligned to allow for free flow of exhaust gas 48 through the nozzle throat 17 while the divergent flaps 40, 42 are rotated more than 90° from axis 50 to provide a forward component of thrust for braking or decelerating the aircraft.

It can now be appreciated that the exhaust system 10 described above provides multifunction capabilities including thrust vectoring, thrust reversing and STOVL functions with an uncomplicated four flap, two dimensional exhaust nozzle. The exhaust system is weight efficient since the same flaps are used as flow control surfaces for all thrust vectoring operations as well as for control of engine back pressure.

The subject exhaust system requires only four flaps wherein the upper and lower flaps in each flap pair are interchangeable. This interchangeability results in reduced inventory and reduced logistical problems and improves the ease of maintenance and enhances system reliability.

There has been disclosed heretofore the best embodiment of the invention presently contemplated. However, it is to be understood that various changes and modifications may be made thereto without departing from the spirit of the invention.

What is claimed is:

1. A multifunction exhaust system for use with a jet engine, said system comprising:
    an exhaust duct for directing the flow of exhaust gasses therethrough;
    a pair of primary flaps operatively associated with said exhaust duct for selectively controlling the direction of said exhaust gasses through said system;
    a center plug extending transversely across said exhaust duct so as to define a pair of exhaust gas flowpaths within said exhaust duct;
    a pair of divergent flaps operatively associated with said exhaust duct for directing the flow of exhaust gasses downstream from said primary flaps;
    a primary pivoting means for pivoting at least one of said primary flaps through a primary flap angle of at least about 90 degrees with respect to said exhaust duct central axis; and
    a secondary pivoting means for pivoting at least one of said secondary flaps through a secondary flap angle of at least about 90 degrees with respect to said exhaust duct central axis.

2. The system of claim 1, wherein said exhaust duct comprises a two dimensional nozzle and wherein said primary flaps extend within said two dimensional nozzle.

3. The system of claim 2, wherein said divergent flaps extend within said two dimensional nozzle.

4. The system of claim 1, wherein said center plug is mounted within said two dimensional nozzle.

5. The system of claim 1, wherein said center plug comprises an aft end portion and wherein said divergent flaps are mounted adjacent said aft end portion.

6. The system of claim 1, wherein said center plug comprises a rectangular cross section.

7. The system of claim 1, wherein said primary flaps are of the same design.

8. The system of claim 1, wherein said divergent flaps are of the same design.

9. The system of claim 1, further comprising a pair of primary flap actuators for respectively pivoting said primary flaps, said primary flap actuators being independently controlled.

10. The system of claim 9, wherein said primary flap actuators are of the same design.

11. The system of claim 1, further comprising a pair of divergent flap actuators for respectively pivoting said divergent flaps, said divergent flap actuators being independently controlled.

12. The system of claim 11, wherein said divergent flap actuators are of the same design.

13. A two-dimensional exhaust nozzle for use with an aircraft jet engine, said nozzle comprising:
    primary flap means pivotally mounted to said nozzle and effective for pivoting at least one primary flap through a primary flap angle of at least about 90 degrees with respect to an exhaust duct central axis;

secondary flap means pivotally mounted to said nozzle downstream from said primary flap means and effective for pivoting at least one secondary flap through a secondary flap angle of at least about 90 degrees with respect to said exhaust duct central axis; and plug means mounted within said nozzle between said primary and secondary flap means.

14. The nozzle of claim 13, wherein said plug means comprises a rectangular plug body portion extending transversely across said nozzle.

15. The nozzle of claim 14, wherein said plug means divides said nozzle into a pair of flowpaths.

16. The nozzle of claim 15, wherein said primary flap means is selectively engageable with said plug means for diverting flow from at least one of said flowpaths.

17. The nozzle of claim 13, wherein said secondary flap means is mounted adjacent an aft portion of said plug means.

18. The nozzle of claim 13, wherein said nozzle comprises a nozzle throat area and wherein said primary flap means is mounted adjacent said nozzle throat area.

19. The nozzle of claim 18, wherein said plug means comprises a rounded front portion disposed adjacent said nozzle throat area.

* * * * *